UNITED STATES PATENT OFFICE.

WILLIAM HENRY AGHAN, OF BURKE'S FLAT, VICTORIA, AUSTRALIA.

PROCESS FOR SEPARATING PRECIOUS METALS FROM THEIR ORES.

1,210,880. Specification of Letters Patent. Patented Jan. 2, 1917.

No Drawing. Application filed December 9, 1914. Serial No. 876,350.

*To all whom it may concern:*

Be it known that I, WILLIAM HENRY AGHAN, a subject of the King of Great Britain, residing at Burke's Flat, in the State of Victoria, Australia, have invented certain new and useful Improvements in Processes for Separating Precious Metals from Their Ores; and I do declare the following to be a full, clear, and exact description of the invention such as will enable others skilled in the art to which it appertains to make and use the same.

The object of this invention is to provide an improved process and chemical means to be used in such process, for the recovery of precious metals from sands, tailings, the residues of batteries, and slimes or alluvial containing coarse or fine gold.

In the past a comparatively low return of gold has been obtained by the mercurial amalgamation system of treatment when applied to auriferous particles in tailings and the like owing to the surfaces of the metal constituents having become oxidized, smeared with earthy matter, or chemically coated with sufficient foreign matter to prevent the metal from coming into intimate contact with the mercury.

My invention embodies the employment of certain chemical means which will remove the above-mentioned disadvantage from the gold constituents in the ores or tailings and render them highly amenable to the amalgamating influence of the quicksilver. The said chemicals also exert a cleansing effect on the mercury by removing superficial impurities therefrom and thus quickening its properties.

I shall now describe the process and means employed therein when treating gold-bearing sands or slimes.

A desired quantity of the auriferous material is fed either into a vat or agitator and immersed in a thoroughly mixed chemical solution, the quantity of which is sufficient to saturate the sands or slimes during treatment. Such solution is used in varying strengths, one consisting approximately of one hundred gallons of water to which is added cyanid of potassium to make same test .1% (point one per cent.) KCN. Sulfuric acid is now added at the rate of twenty cubic centimeters to each one hundred gallons of solution. Twenty-four penny weights of corrosive sublimate, and forty-eight penny weights of common salt are then added and the solution is thoroughly mixed.

The sands or slimes to be treated are first put into a vat or agitator and sufficient solution run on to thoroughly immerse same, either by percolation or agitation for a suitable length of time, preferably not less than ten minutes, and longer according to the class of sand or slime under treatment. Sufficient water is now added to the mixture to bring it to a liquid condition, so as to allow the fine and coarse particles of gold to amalgamate in any suitable apparatus. By the addition of sulfuric acid before mentioned, the cyanid in solution is intensified in its cleansing power, any impure matters, acid or metallic coating around the gold is dissolved and the precious metal is free and amenable to amalgamation.

The addition of the before mentioned corrosive sublimate has the tendency to coat and add extra weight to the very fine particles of gold and thus materially assists in the amalgamation. The addition of the before mentioned common salt acts as a precipitating agency to the same end.

By experiment, I have found the solution very effective in the following strengths—cyanid of potassium from .1% (point one per cent.) KCN to .02% (point naught two per cent.) KCN. And sulfuric acid at the rate of twelve cubic centimeters to ninety-six cubic centimeters to every one hundred gallons of solution.

The quantity of cyanid and sulfuric acid to be used in the solution must be according to the nature of the sand or slimes being treated, for example—if the ore does not contain acids (mineral) and is free, the weakest of my solutions will be used.—The more complex the ore, the stronger the solution, until it reaches the strength as first given. When there are free mineral acids in the sand slimes or tailings to be treated, it is preferable to use sufficient lime in same before adding the solution, so that any free and mineral acids are neutralized, and the ore sweetened, allowing the gold to become more amenable to amalgamation.

I reserve to myself the right to omit the cyanid of potassium from the mixture when treating certain tailings or slimes wherein its action is not found necessary, without departing from my invention.

I claim:—

1. In separating precious metals from their ores—subjecting such ores to the action of a bath containing a solution of water, cyanid of potassium, sulfuric acid, corrosive sublimate, and common salt, in the approximate proportions described, other reagents capable of modifying the action on the bath being excluded.

2. In separating precious metals from their ores—subjecting such ores to the action of a bath containing a solution of water, sulfuric acid, corrosive sublimate, and common salt, in the approximate proportions described, other reagents capable of modifying the action on the bath being excluded.

3. In separating precious metals from their ores—subjecting the ores to treatment with lime to neutralize the same, and then to a treatment with a solution consisting of water, cyanid of potassium, sulfuric acid, corrosive sublimate, and common salt, other reagents capable of modifying the action on the bath being excluded.

In testimony whereof I have signed my name to this specification in the presence of two subscribing witnesses.

WILLIAM HENRY AGHAN.

Witnesses:
AUGUSTINE THOMAS MADDEN,
ALICE HARKER.

Copies of this patent may be obtained for five cents each, by addressing the "Commissioner of Patents, Washington, D. C."